(12) United States Patent
Boni et al.

(10) Patent No.: US 11,933,968 B2
(45) Date of Patent: *Mar. 19, 2024

(54) BIAXIAL RESONANT MICROELECTROMECHANICAL MIRROR STRUCTURE WITH PIEZOELECTRIC ACTUATION HAVING IMPROVED CHARACTERISTICS

(71) Applicant: STMicroelectronics S.r.l., Agrate Brianza (IT)

(72) Inventors: Nicolo' Boni, Mountain View, CA (US); Roberto Carminati, Piancogno (IT); Massimiliano Merli, Stradella (IT)

(73) Assignee: STMicroelectronics S.r.l., Agrate Brianza (IT)

(*) Notice: Subject to any disclaimer, the term of this patent is extended or adjusted under 35 U.S.C. 154(b) by 0 days.

This patent is subject to a terminal disclaimer.

(21) Appl. No.: 17/964,672

(22) Filed: Oct. 12, 2022

(65) Prior Publication Data

US 2023/0035607 A1 Feb. 2, 2023

Related U.S. Application Data

(63) Continuation of application No. 16/827,282, filed on Mar. 23, 2020, now Pat. No. 11,520,138.

(30) Foreign Application Priority Data

Mar. 22, 2019 (IT) .......................... 102019000004199

(51) Int. Cl.
*G02B 26/08* (2006.01)
*G02B 26/10* (2006.01)
(Continued)

(52) U.S. Cl.
CPC ....... *G02B 26/0858* (2013.01); *G02B 26/101* (2013.01); *G03B 21/008* (2013.01); *H02N 2/028* (2013.01)

(58) Field of Classification Search
CPC .......................... G02B 26/0858; G02B 26/101; G03B 21/008; H02N 2/028; B81B 7/02; B81B 2201/042
See application file for complete search history.

(56) References Cited

U.S. PATENT DOCUMENTS 6,049,407 A  4/2000 Melville
6,379,510 B1  4/2002 Kane et al.
(Continued)

FOREIGN PATENT DOCUMENTS

CN  212276107 U  * 1/2021
EP  3173843 A1  6/2016
(Continued)

OTHER PUBLICATIONS

IT Search Report and Written Opinion for IT Appl. No. 102019000004199 dated Nov. 19, 2019 (7 pages).
(Continued)

*Primary Examiner* — Michael Lee
(74) *Attorney, Agent, or Firm* — Crowe & Dunlevy LLC

(57) ABSTRACT

A microelectromechanical (MEMS) structure includes a fixed frame internally defining a cavity, and a mobile mass suspended in the cavity and movable with a first resonant rotational mode about a first rotation axis and with a second resonant rotational mode about a second rotation axis orthogonal to the first. A pair of supporting elements extends in the cavity, is rigidly coupled to the fixed frame, and is elastically deformable to cause rotation of the mobile mass about the first rotation axis. A pair of elastic-coupling elements is elastically coupled between the mobile mass and the first pair of supporting elements. Each of the elastic- (Continued)

coupling elements includes a first and second elastic portions, the first elastic portion being compliant to torsion about the second rotation axis. The second elastic portion is compliant to bending outside of a horizontal plane of main extension of the MEMS structure.

20 Claims, 5 Drawing Sheets

(51) Int. Cl.
    *G03B 21/00*     (2006.01)
    *H02N 2/02*     (2006.01)

(56)     References Cited

U.S. PATENT DOCUMENTS

| | | | |
|---|---|---|---|
| 7,295,726 B1 | 11/2007 | Milanovic et al. | |
| 7,428,353 B1 | 9/2008 | Milanovic et al. | |
| 10,871,645 B2 * | 12/2020 | Pu | H03L 7/099 |
| 11,327,295 B2 * | 5/2022 | Carminati | B81B 3/0021 |
| 11,520,138 B2 * | 12/2022 | Boni | G03B 21/008 |
| 2002/0171901 A1 | 11/2002 | Bernstein | |
| 2004/0008400 A1 | 1/2004 | Hill et al. | |
| 2005/0094931 A1 | 5/2005 | Yokoyama et al. | |
| 2008/0239252 A1 | 10/2008 | Konno et al. | |
| 2010/0014140 A1 | 1/2010 | Akedo et al. | |
| 2011/0205608 A1 | 8/2011 | Mizoguchi | |
| 2011/0292480 A1 * | 12/2011 | Ma | G02B 26/0841 |
| | | | 359/199.4 |
| 2012/0033280 A1 | 2/2012 | Mizoguchi et al. | |
| 2012/0320379 A1 | 12/2012 | Hofmann et al. | |
| 2013/0208330 A1 | 8/2013 | Naono | |
| 2015/0109604 A1 * | 4/2015 | Masuda | G01S 17/42 |
| | | | 356/4.07 |
| 2017/0155879 A1 * | 6/2017 | Giusti | G02B 26/101 |
| 2018/0031823 A1 * | 2/2018 | Carminati | G03B 21/008 |
| 2018/0059406 A1 * | 3/2018 | Torkkeli | G02B 26/105 |
| 2019/0339514 A1 | 11/2019 | Erkkila et al. | |
| 2020/0018948 A1 * | 1/2020 | Steiner | G02B 26/101 |
| 2020/0200535 A1 * | 6/2020 | Kuisma | G01C 19/5712 |
| 2020/0263988 A1 * | 8/2020 | Blomqvist | G01C 19/5684 |
| 2020/0271920 A1 * | 8/2020 | Hirata | G01S 7/4972 |
| 2021/0036592 A1 * | 2/2021 | Suzuki | B06B 1/045 |

FOREIGN PATENT DOCUMENTS

| | | |
|---|---|---|
| EP | 3287830 A1 | 8/2017 |
| JP | H01276114 A | 11/1989 |

OTHER PUBLICATIONS

First Office Action for counterpart EP Appl. No. 20159965.1, report dated Aug. 25, 2022, 5 pgs.

\* cited by examiner

BIAXIAL RESONANT MICROELECTROMECHANICAL MIRROR STRUCTURE WITH PIEZOELECTRIC ACTUATION HAVING IMPROVED CHARACTERISTICS

PRIORITY CLAIM

This is a continuation of U.S. patent application Ser. No. 16/827,282, which claims the priority benefit of Italian Application for Patent No. 102019000004199, filed on Mar. 22, 2019, the contents of both of which are hereby incorporated by reference in its entirety to the maximum extent allowable by law.

TECHNICAL FIELD

This disclosure relates to a biaxial resonant microelectromechanical mirror structure with piezoelectric actuation, constructed using Micro-Electro-Mechanical System (MEMS) technology.

BACKGROUND

Microelectromechanical structures, in the following, referred to as "MEMS structures", comprise a mobile mass carrying a reflecting surface. The reflecting surface may be referred to as a "mirror" surface, and is made starting from a body of semiconductor material, such as silicon, and is elastically supported above a cavity so as to be properly orientable.

These MEMS mirror structures are, for example, used in miniaturized projector devices (e.g., pico-projector devices), for directing, in desired patterns, beams of light radiation generated by a light source (e.g., a laser source), in order to project images at a distance. Pico-projector devices can be used in portable electronic apparatuses, such as smartphones, tablets, phablets, notebooks or PDAs (Personal Digital Assistants).

Typically, a deviation of the light beam along two axes is required to generate images; this can be obtained by utilizing two MEMS mirror structures of a uniaxial type or by utilizing a single MEMS mirror structure of a biaxial type. In the case of a MEMS structure of a biaxial type, the mobile mass is driven so as to rotate about a first rotation axis and a second rotation axis, orthogonal to one another.

In particular, to generate a scanning pattern of a "raster" type, rotation about a first axis is performed with resonant movement (i.e., with a periodic or quasi-periodic oscillation at a frequency close to the mechanical resonance frequency) to generate a fast scan, whereas rotation about a second axis is performed with a linear or quasi-static movement (i.e., at a frequency much lower than the frequency of the resonant movement) to generate a slow scan, for example with a sawtooth pattern.

To generate a scanning pattern of a so-called Lissajous type, both rotations of the mobile mass, about the first and the second rotation axes, are performed with a resonant movement, with frequencies substantially equal to the resonance frequencies of the mirror structure, with respect to the aforesaid rotation axes.

In general, the resonant movement enables maximization of the angular distance covered by the mobile mass during each oscillation and hence maximization of the size of the portion of space scanned given the same dimensions of the structure, and for this reason is advantageous.

It is also known that, in the case of resonant bi-axial scanning, the image refresh rate is equal to the frequency difference ($\Delta f$) between the values of the resonance frequencies about the two rotation axes.

For video applications in the visible spectrum, the aforesaid frequency difference $\Delta f$ is typically comprised in a range between 24 Hz and 120 Hz, for example 60 Hz, in order to prevent flickering of the images; for other types of application (for example 3D sensing) a frequency difference $\Delta f$ lower than 24 Hz or higher than 120 Hz may be required. Rotation of the MEMS mirror structure is controlled via an actuation system that may be of an electrostatic, electromagnetic, or piezoelectric type.

Electrostatic actuation systems in general require high operating voltages, whereas electromagnetic actuation systems in general entail high-power consumption.

It has thus been proposed to control the scanning movement by using piezoelectric actuators, having the advantage of requiring lower actuation voltages and power consumption levels with respect to structures with electrostatic or electromagnetic actuation.

For instance, U.S. Pat. No. 9,843,779 (EP 3,173,843), the contents of which are incorporated by reference, discloses a resonant biaxial MEMS mirror structure with piezoelectric actuation.

As schematically shown in FIG. 1, this MEMS structure, designated as a whole by 1, is made in a body of semiconductor material 2, in particular silicon, in which a frame 3 is formed, internally defining a cavity 4.

The MEMS structure 1 comprises a mobile mass 5, suspended within the cavity 4 and elastically coupled to the frame 3 by four elastically deformable supporting elements 6.

The mobile mass 5 has a main extension in a horizontal plane XY (with a much smaller extension along a vertical axis Z, orthogonal to the aforesaid horizontal plane XY) and has a substantially circular conformation in the same horizontal plane XY; the mobile mass 5 moreover carries, at the top, a reflecting surface, the so-called mirror surface, 7.

The supporting elements 6 are coupled to the mobile mass 5, in pairs, at diametrically opposite portions along first and second horizontal axes X, Y of the aforesaid horizontal plane XY. The supporting elements 6 have a main body 6a, the main bodies 6a having an extension, in pairs, along the second and, respectively, the first horizontal axis Y, X, and having a first end coupled to the mobile mass 5 by a connection portion 6b, transverse to the main body 6a, and a second end coupled to the frame 3.

The aforesaid main body 6a of the supporting elements 6 carries at the top a plurality of first regions of piezoelectric material 8, having an extension transverse to the corresponding extension of the main body 6a and arranged at a regular distance along the same main body 6a; and a plurality of second regions of piezoelectric material 9, each arranged between a respective pair of first regions of piezoelectric material 8.

The first regions of piezoelectric material 8 are electrically connected—by respective connection paths, not illustrated, which extend along the main body 6a of the corresponding supporting element 6—to a respective DC power source, for example supplying a DC voltage of 40 V; whereas the second regions of piezoelectric material 9 are electrically connected—by respective connection paths, which are also not illustrated, and extend along the main body 6a of the supporting element 6—to a respective AC power source, for example supplying an AC voltage of 40 V.

The aforesaid second regions of piezoelectric material 9 define actuation electrodes for the MEMS structure 1, which, when electrically supplied by the respective AC power source, cause a deformation of the corresponding supporting element 6 outside of the horizontal plane XY, as schematically illustrated in FIG. 2A and in FIG. 2B, with a resonance oscillation.

In particular, by appropriate biasing of the aforesaid second regions of piezoelectric material 9, the mobile mass 5 is driven: in a first resonant movement of rotation, about a first rotation axis A1 of the horizontal plane XY (having a first inclination of 45° with respect to the first and the second horizontal axes X, Y), as illustrated in FIG. 2A; and in a second resonant movement of rotation, about a second rotation axis A2 of the horizontal plane XY (having a second inclination of 45° with respect to the first and second horizontal axes X, Y), transverse to the aforesaid first axis A1, as illustrated in FIG. 2B.

Moreover, the aforesaid first regions of piezoelectric material 8 define adjustment electrodes for the MEMS structure 1 and appropriate biasing thereof enables adjustment of the resonance frequency of the first movement of rotation with respect to the resonance frequency of the second movement of rotation, so as to establish a desired frequency difference Δf (for example, 60 Hz) between the same resonance frequencies, which otherwise (in the absence of biasing of the adjustment electrodes) would have indeed substantially the same value, given the symmetry of the MEMS structure 1.

Although advantageously allowing obtainment of a particularly compact biaxial resonant mirror structure, the aforesaid MEMS structure 1 is not without drawbacks.

Firstly, the above MEMS structure 1 has mutual coupling and interference (the cross-axis interference), between the movements of rotation about the first and the second rotation axes A1, A2. Cross-axis interference entails a greater complexity at the level of the final system (in particular, regarding generation of the actuation and control signals).

As it is evident, and as it is on the other hand illustrated in the aforesaid FIGS. 2A and 2B, the four supporting elements 6 participate together, undergoing deformation, both in the first and in the second movement of rotation about the first and the second rotation axes A1, A2, respectively.

Consequently, application of a biasing voltage to the actuation electrodes associated with a first rotation axis entails a corresponding movement about the second rotation axis, and vice versa.

Likewise, application of a biasing voltage to the adjustment electrodes associated with a first rotation axis entails a deformation also of the supporting elements 6 associated with the second rotation axis, and vice versa.

There is a need in the art to provide a MEMS mirror structure that will overcome at least in part the drawbacks of the prior art and in particular will have a reduced sensitivity to cross-axis interference.

SUMMARY

Disclosed herein is a microelectromechanical (MEMS) structure, including: a fixed frame internally defining a cavity; a mobile mass elastically suspended in the cavity and movable with a first resonant rotational mode about a first rotation axis and with a second resonant rotational mode about a second rotation axis orthogonal to the first rotation axis; a pair of supporting elements extending in the cavity and being rigidly coupled to the fixed frame and elastically deformable to cause rotation of the mobile mass about the first rotation axis; and a pair of elastic-coupling elements elastically coupled between the mobile mass and the first pair of supporting elements. Each of the elastic-coupling elements of the pair of elastic-coupling elements comprises a first elastic portion and a second elastic portion, the first elastic portion being compliant to torsion about the second rotation axis, The second elastic portion of the elastic-coupling elements of the pair of elastic-coupling elements is compliant to bending outside of a horizontal plane of main extension of the MEMS structure.

The pair of elastic-coupling elements may be compliant to rotation about the second rotation axis and rigid with respect to rotation about the first rotation axis.

The MEMS structure may include a main extension in a horizontal plane, with the pair of supporting elements extending along a first horizontal axis of the horizontal plane, on opposite sides of the mobile mass with respect to a second horizontal axis of the horizontal plane, orthogonal to the first horizontal axis. The pair of supporting elements may include first and second supporting portions, which have first ends coupled to the fixed frame and second ends connected by a connection portion, coupled to a respective one of the pair of elastic-coupling elements. The first and second supporting portions of the pair of supporting elements may carry, at a top thereof, a respective actuation electrode which is biased to cause deformation by piezoelectric effect.

The actuation electrodes of a first supporting element of the pair of supporting elements may be configured to be biased at a first AC biasing voltage and the actuation electrodes of a second supporting element of the pair of supporting elements may be configured to be biased at a second AC biasing voltage in phase opposition with respect to the first AC biasing voltage, to cause the rotation of the mobile mass about the first rotation axis at a first resonance frequency.

The first and second supporting elements may also carry, at a top, a respective adjustment electrode which is biased to cause deformation by piezoelectric effect. The adjustment electrodes of the first and second supporting elements may be configured to be biased at a first DC biasing voltage to vary the second resonance frequency for rotation of the mobile mass about the second rotation axis.

The first and second supporting elements may each carry, at a top, a region of piezoelectric material arranged on which are their respective actuation electrode and their respective adjustment electrode.

Electrical-contact pads, carried by the fixed frame, may electrically connect to the actuation and adjustment electrodes by respective electrical-connection paths. The electrical-connection paths may extend outside with respect to the first and second supporting elements.

Each of the elastic-coupling elements of the pair of elastic-coupling elements may include a first elastic portion and a second elastic portion. A first elastic portion of the elastic-coupling elements of the pair of elastic-coupling elements may be compliant to torsion about the second rotation axis, and a second elastic portion of the elastic-coupling elements of the pair of elastic-coupling elements may be compliant to bending outside of a horizontal plane of main extension of the microelectromechanical structure.

The first elastic portions of each of the pair of elastic-coupling elements may be of a torsional linear type and have a rectilinear extension with a first end connected to a corresponding supporting element and a second end, opposite to the first end, connected to the corresponding second elastic portions of each of the pair of elastic-coupling elements. The second elastic portion may be of a folded type, with a main extension in a direction transverse to the rectilinear extension of the first elastic portion and a first end connected to the first elastic portion and a second end, opposite to the first end, connected to a facing end portion of the mobile mass.

The first elastic portion of the elastic-coupling elements of the pair of elastic-coupling elements may have a rectilinear extension along the second rotation axis.

A torsional stiffness of the first elastic portion of the pair of elastic-coupling elements may be defined as a function of bending stiffness of the second elastic portion of the pair of elastic-coupling elements and as a function of a stiffness of the pair of supporting elements, so that the first and second rotation axes of the mobile mass are aligned with a direction of extension of the first elastic portion of the elastic-coupling elements of the pair of elastic-coupling elements.

Also disclosed herein is a pico-projector device including the MEMS structure described above, including a mirror surface carried by the mobile mass of the MEMS structure. The pico-projector device also includes a light source driven for generation of a light beam as a function of an image to be generated and a driving circuit configured to supply electrical driving signals to cause rotation of the mobile mass.

BRIEF DESCRIPTION OF THE DRAWINGS

For a better understanding of the present invention, preferred embodiments thereof are now described, purely by way of non-limiting example, with reference to the attached drawings, wherein.

DETAILED DESCRIPTION

Figure 1:
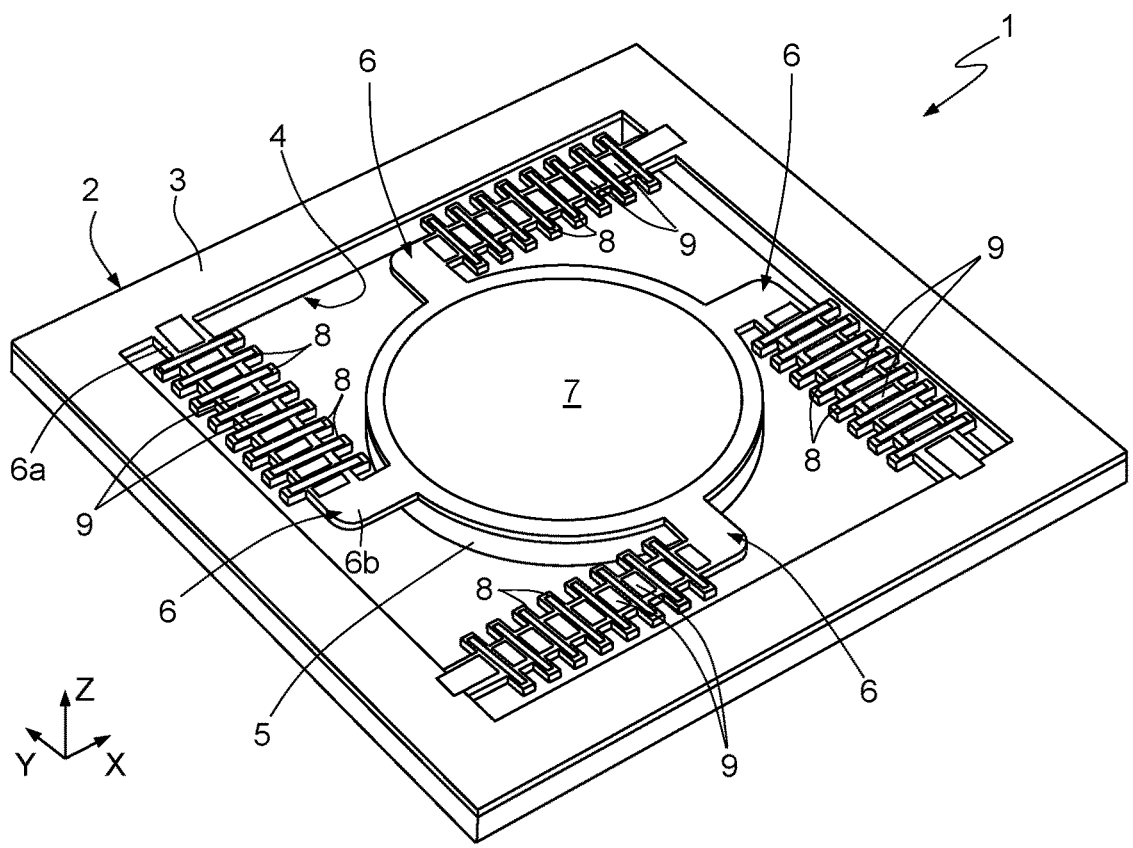
FIG. 1 is a schematic view of a biaxial resonant MEMS mirror structure with piezoelectric actuation, of a known type.
Figures 2A, 2B:
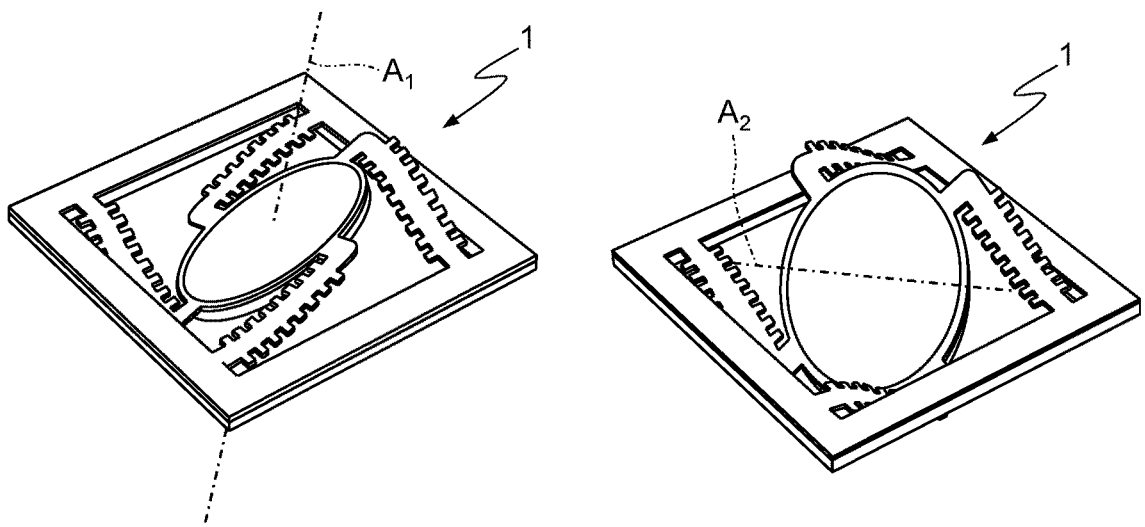
FIGS. 2A and 2B are schematic views of the MEMS structure of FIG. 1, driven with first and second movements of rotation, respectively.
Figure 3:
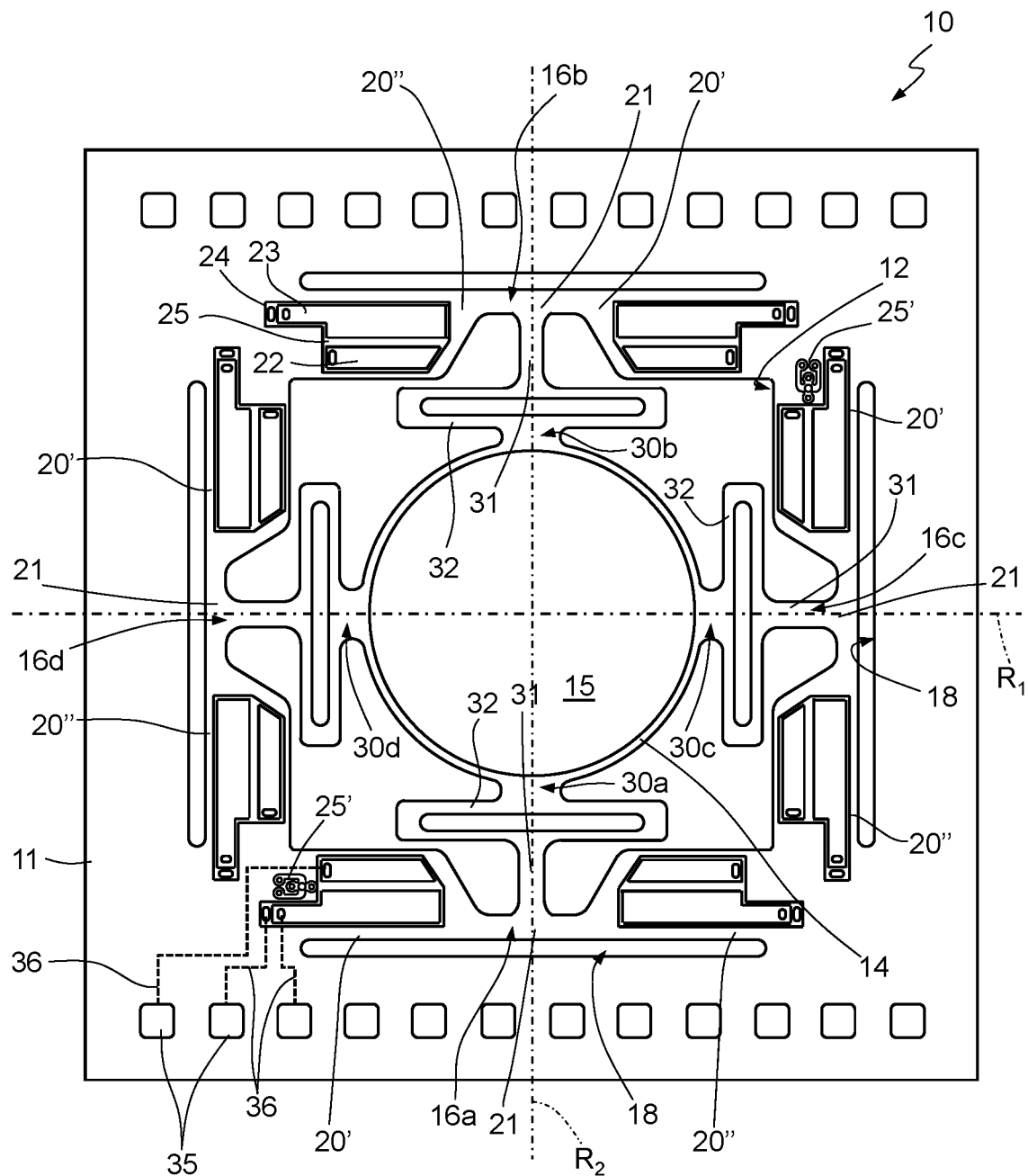
FIG. 3 is a schematic plan view of a biaxial resonant MEMS mirror structure with piezoelectric actuation, according to an embodiment of the present solution.
Figure 3:
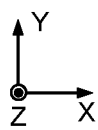

FIG. 3 is a schematic illustration of a MEMS structure 10, in particular a biaxial resonant mirror structure with piezoelectric actuation, according to an embodiment disclosed herein.

The MEMS structure 10 is formed in a die of semiconductor material, in particular silicon, having a fixed part, which forms a frame 11, internally defining a cavity 12. In the example, the cavity 12 has a substantially square shape in a horizontal plane XY, that is a plane of main extension of the same MEMS structure 10 (which has a much smaller extension along a vertical axis Z, orthogonal to the horizontal plane XY).

The MEMS structure 10 comprises a mobile mass 14, that can be tilted by piezoelectric actuation (as will be described in detail hereinafter) and which carries, at the top, a surface of reflecting material 15 (e.g., the mirror surface). In the example, the mobile mass 14 has a substantially circular shape in the horizontal plane XY.

In particular, the mobile mass 14 is configured to rotate about a first rotation axis R1, parallel to a first horizontal axis X of the aforesaid horizontal plane XY, and about a second rotation axis R2, parallel to a second horizontal axis Y of the aforesaid horizontal plane XY, orthogonal to the first horizontal axis X. The first rotation axis R1 represents a first median axis of symmetry for the MEMS structure 10, and the second rotation axis R2 represents a second median axis of symmetry for the same MEMS structure 10.

The MEMS structure 10 comprises: first and second supporting elements 16a, 16b, which are elastically deformable and extend longitudinally along the first horizontal axis X within the cavity 12 starting from the frame 11, on opposite sides of the mobile mass 14 with respect to the second horizontal axis Y; and a third and a fourth supporting element 16c, 16d, which are also elastically deformable and extend longitudinally along the second horizontal axis Y within the cavity 12 starting from the frame 11, on opposite sides of the mobile mass 14 with respect to the first horizontal axis X.

The aforesaid supporting elements 16a-16d extend in cantilever fashion above the cavity 12 inside the frame 11, adjacent to the frame 11 from which they are separated by a slit 18 (forming part of the aforesaid cavity 12) and are rigidly connected to the frame 11 at its internal corners.

In particular, each supporting element 16a-16d comprises first and second supporting portions 20', 20", which extend along the first or the second horizontal axis X, Y, on opposite sides of the second rotation axis R2 or the first rotation axis R1, in the example having a substantially trapezoidal shape in the horizontal plane XY, with a first side coupled to the frame 11 at a respective internal corner thereof. The aforesaid first and second supporting portions 20', 20" are moreover connected together, at the second or first rotation axis R2, R1 and at a second side thereof, by a connection portion 21, having a substantially rectangular shape, with a size (along the second or the first horizontal axis Y, X) smaller than the height of the first and the second supporting portions 20', 20".

The first and second supporting portions 20', 20" of each supporting element 16a-16d carry, at the top, a respective actuation electrode 22 and a respective adjustment electrode 23, which are designed to cause deformation of the corresponding supporting element 16a-16d by the piezoelectric effect (as will be described in detail hereinafter).

In particular, a first region of conductive material, for example metal material, is present on the semiconductor material of each supporting portion 20', 20", forming a common electrode 24; moreover, a region of piezoelectric material 25, for example PZT (Lead Zirconate Titanate) is arranged on the common electrode 24, and the aforesaid actuation electrode 22 and adjustment electrode 23, which, for example, are also made of metal material, are arranged on the region of piezoelectric material 25.

The above actuation electrodes 22 and adjustment electrodes 23 are arranged side-by-side, appropriately electrically insulated from one another, and have a substantially rectangular shape in the horizontal plane XY. In the embodiment illustrated, the adjustment electrodes 23 have a greater extension in the horizontal plane XY than the actuation electrodes 22.

A piezoresistive (PZR) sensor 25' is arranged adjacent to the aforesaid actuation electrodes 22 and the aforesaid adjustment electrodes 23, at the first supporting portion 20' of the first and the third supporting elements 16a, 16c (alternatively, and in a similar way not illustrated here, of the second and fourth supporting elements 16b, 16d). The piezoresistive sensor 25' is appropriately arranged so as to supply a sensing signal associated with rotation of the mobile mass 14 about the second and the first rotation axes R2, R1; this detecting signal can be supplied, as a feedback, to the outside of the MEMS structure 10.

The piezoresistive sensor 25' is formed, for example by surface diffusion of doping atoms, at the side of the first supporting portion 20' of the respective first and third supporting elements 16a, 16c that is coupled to the respective internal corner of the frame 11.

The MEMS structure 10 further comprises elastic-coupling elements 30a-30d, which elastically couple the mobile mass 14 to one of the respective supporting elements 16a-16d, in particular: first and second elastic-coupling elements 30a, 30b, which couple respective end portions of the mobile mass 14 diametrically opposite along the second rotation axis R2 to the first and the second supporting elements 16a, 16b; and a third and a fourth elastic-coupling element 30c, 30d, which couple respective end portions of the mobile mass 14 diametrically opposite along the first rotation axis R1 to the third and the fourth supporting elements 16c, 16d.

Each elastic-coupling element 30a-30d comprises first and second elastic portions 31, 32.

In detail, the first elastic portion 31, which is of a linear and torsional type, has a rectilinear extension (along the first or the second horizontal axis X, y) and a first end connected to the respective supporting element 16a-16d, at the corresponding connection portion 21, and a second end, opposite to the first end, connected to the second elastic portion 32; the second elastic portion 32, of a folded type, is, in the embodiment illustrated, shaped like a rectangular ring with a greater extension in a direction transverse to the rectilinear extension of the first elastic portion 31, with a first end connected to the aforesaid first elastic portion 31 and a second end, opposite to the first end, connected to a facing end portion of the mobile mass 14.

During operation, and as will be discussed in greater detail hereinafter, the elastic-coupling elements 30a-30d enable the movement of rotation of the mobile mass 14 about the first rotation axis R1 and, in a way entirely decoupled and without mutual interference, about the second rotation axis R2, as a result of biasing of the actuation electrodes 22.

In particular, the first elastic portion 31 of the first and the second elastic-coupling elements 30a, 30b is compliant to torsion about the second rotation axis R2, and likewise the first elastic portion 31 of the second and the fourth elastic-coupling elements 30c, 30d is compliant to torsion about the first rotation axis R1.

The second elastic portion 32 of the elastic-coupling elements 30a-30d is, instead, compliant to bending outside of the horizontal plane XY and to deformation along the vertical axis Z, being instead rigid with respect to the rotation (about the first or the second rotation axis R1, R2).

The torsional stiffness of the linear elastic elements (first elastic portion 31 of the aforesaid elastic-coupling elements 30a-30d) is moreover defined in an appropriate manner with respect the bending stiffness of the folded elastic elements (second elastic portion 32 of the elastic-coupling elements 30a-30d) and also with respect to the stiffness of the supporting elements 16a-16d, so that the rotation axes of the mobile mass 14 (the aforesaid first and second rotation axes R1, R2) are effectively aligned with the direction of extension of the linear elastic elements (along the first horizontal axis X or the second horizontal axis Y).

In this manner, rotation of the mobile mass 14 about the first and the second rotation axes R1, R2 is effectively decoupled, a rotation about one of the rotation axes not causing, that is, appreciable deformation of the supporting elements associated with the other rotation axis.

From the foregoing description and from an examination of FIG. 3, the symmetrical arrangement of the MEMS structure 10 is evident, in particular with respect to the first and the second rotation axes R1, R2 and with respect to further median axes of symmetry (not shown in the aforesaid FIG. 3) that belong to the horizontal plane XY, inclined by 45° with respect to the aforesaid rotation axes R1, R2 and passing through the center of the mobile mass 14.

As illustrated schematically in the aforesaid FIG. 3, the MEMS structure 10 further comprises a plurality of electrical-contact pads 35, formed at the frame 11, electrically connected to the actuation electrodes 22 and the adjustment electrodes 23 for enabling electrical biasing thereof by electrical signals coming from outside the MEMS structure 10 (for example, supplied by a biasing device of an electronic apparatus in which the MEMS structure 10 is integrated) and moreover to the common electrode 24 and to the piezoresistive sensors 25', by respective electrical-connection paths 36 (for simplicity of illustration, one example of these electrical-connection paths 36 is shown in FIG. 3).

In the embodiment illustrated, the electrical-contact pads 35 are arranged aligned parallel to the first horizontal axis X, in two rows positioned on the frame 11 on opposite sides of the cavity 12 with respect to the second horizontal axis Y.

It should be noted that, advantageously, the electrical-connection paths 36 have a reduced length, thanks to the arrangement of the contact points with the aforesaid actuation electrodes 22 and adjustment electrodes 23 at the internal corners of the frame 11, with a consequent simplification of routing of the electrical connections towards the electrical-contact pads 35.

In addition, the electrical-connection paths 36 do not extend over the supporting elements 16a-16d, but pass on the outside thereof, hence not causing an appreciable variation of the corresponding elastic characteristics.

Figure 4A:
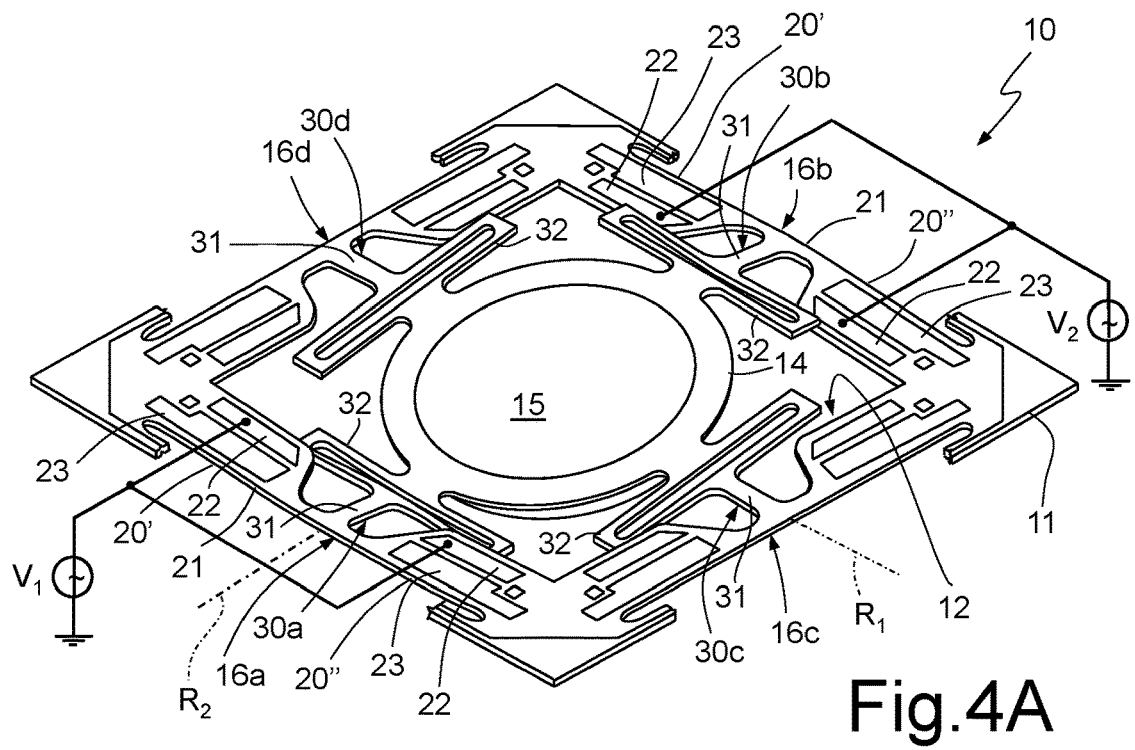
FIGS. 4A and 4B are schematic views of the MEMS structure of FIG. 3, driven with first and second movements of rotation, respectively.

In greater detail, and with reference to FIG. 4A, a first rotational mode of the MEMS structure 10, comprised of a rotation about the first rotation axis R1, is obtained by biasing first and second sets of the actuation electrodes 22 associated with the supporting elements 16a-16d, in particular: by biasing both of the actuation electrodes 22 of the first supporting element 16a (that are associated with the corresponding first and second supporting portions 20', 20") at a first biasing voltage V1— an AC voltage—at the resonance frequency; and by biasing both of the actuation electrodes 22 of the second supporting element 16b (that are associated with the corresponding first and second supporting portions 20', 20") at a second biasing voltage V2— an AC voltage— at the resonance frequency, in phase opposition with respect to the first biasing voltage V1.

It should be noted that the actuation electrodes 22 associated with the third and the fourth supporting elements 16c, 16d are not biased and in no way participate in the aforesaid first rotational mode of the MEMS structure 10.

As illustrated in the aforesaid FIG. 4A, the biasing of the first and the second sets of actuation electrodes 22 causes deformation outside of the horizontal plane XY of the first and the second supporting elements 16a, 16b, in opposite directions of the vertical axis Z (in the example, an upward deformation of the second supporting element 16b and a downward deformation of the first supporting element 16a).

Such deformation causes a corresponding displacement along the vertical axis Z of the first and the second elastic-coupling elements 30a, 30b, in particular allowed by the flexural deformation of the corresponding second elastic portion 32, once again in opposite directions of the vertical axis Z (it should be noted that the first elastic portion 31 of the first and second elastic-coupling elements 30a, 30b is substantially rigid with respect to this deformation), and a corresponding displacement of the aforesaid coupled end portions of the mobile mass 14, which is consequently driven in rotation about the first rotation axis R1.

This rotation is allowed by the torsional deformation of the first elastic portion 31 of the third and the fourth elastic-coupling elements 30c, 30d (it should be noted that the second elastic portion 32 of the third and fourth elastic-coupling elements 30c, 30d is substantially rigid in regard to this torsion), which absorbs substantially the entire movement of rotation; this movement of rotation is hence not transmitted to the associated third and fourth supporting elements 16c, 16d, which do not undergo deformation.

Figure 4B:
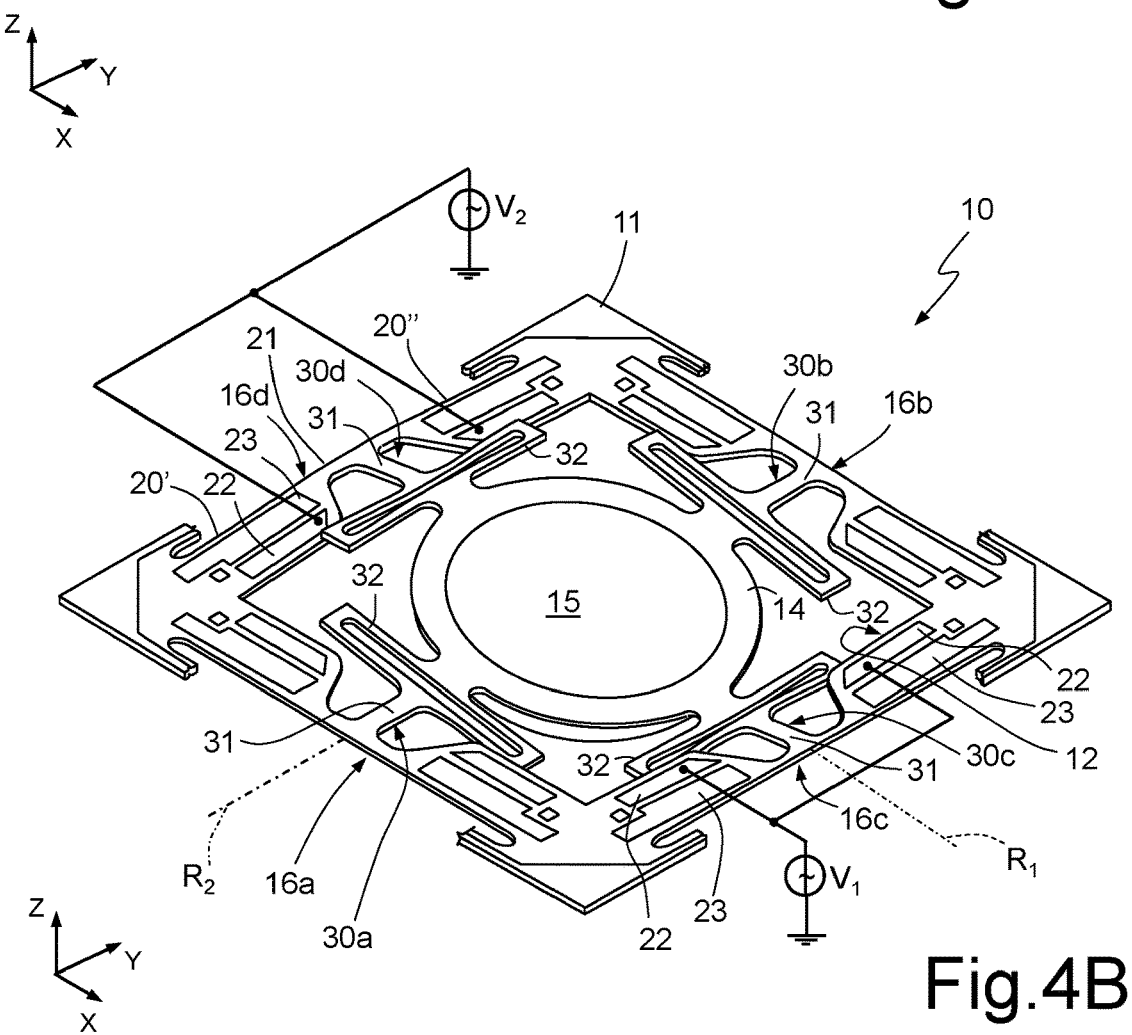

In a substantially similar manner, and as illustrated in FIG. 4B, a second rotational mode of the MEMS structure 10 (decoupled from the aforesaid first rotational mode), comprised of a rotation about the second rotation axis R2, is obtained by biasing a third and a fourth set of the actuation electrodes 22, 22 associated with the supporting elements 16a-16d, and in particular: biasing both of the actuation electrodes 22 of the third supporting element 16c (that are associated with the corresponding first and second supporting portions 20', 20") at a respective first biasing voltage V1—an AC voltage—at the resonance frequency; and biasing both of the actuation electrodes 22 of the fourth supporting element 16d at a respective second biasing voltage V2—an AC voltage—at the resonance frequency, in phase opposition with respect to the first biasing voltage V1.

It should be noted that the actuation electrodes 22 associated with the first and the second supporting elements 16a, 16b in this case are not biased and in no way participate in the aforesaid second rotational mode of the MEMS structure 10.

As illustrated in the aforesaid FIG. 4B, biasing of the second set of actuation electrodes 22 causes deformation outside of the horizontal plane XY of the third and the fourth supporting elements 16c, 16d, in a direction opposite to the aforesaid vertical axis Z (in the example, an upwards deformation of the fourth supporting element 16d and a downwards deformation of the third supporting element 16c).

The above deformation causes a corresponding displacement along the vertical axis Z of the third and fourth elastic-coupling elements 30c, 30d, in particular allowed by the flexural deformation of the corresponding second elastic portion 32, once again in opposite directions of the vertical axis Z (the first elastic portion 31 of the third and fourth elastic-coupling elements 30c, 30d being substantially rigid with respect to this deformation), and a corresponding displacement of the coupled end portions of the mobile mass 14, which is consequently driven in rotation about the second rotation axis R2.

The above rotation is allowed by the torsional deformation of the first elastic portion 31 of the first and the second elastic-coupling elements 30a, 30b (the second elastic portion 32 of the same first and second elastic-coupling elements 30a, 30b being substantially rigid with respect to this torsion), which substantially absorbs the entire movement of rotation; this movement of rotation is hence not transmitted to the first and second coupled supporting elements 16a, 16b, which do not undergo deformation.

It should be noted that, given the total symmetry of the MEMS structure 10, the resonance frequencies of the movements of rotation about the first and the second rotation axes R1, R2 are substantially the same, in the absence of biasing of the adjustment electrodes 23.

Application of an appropriate DC biasing voltage to the aforesaid adjustment electrodes 23 enables appropriate variation of one or both of the aforesaid resonance frequencies in order to obtain a desired frequency difference $\Delta f$, for example comprised in a range between 24 Hz and 150 Hz, for example equal to 60 Hz (in the case of applications in the visible, it being, however, possible for this frequency difference $\Delta f$ to have a value, even outside the aforesaid frequency range, in the case of different applications).

In particular, the adjustment electrodes 23 are divided into two sets, associated with the first and the second rotational modes, respectively.

Figure 5:
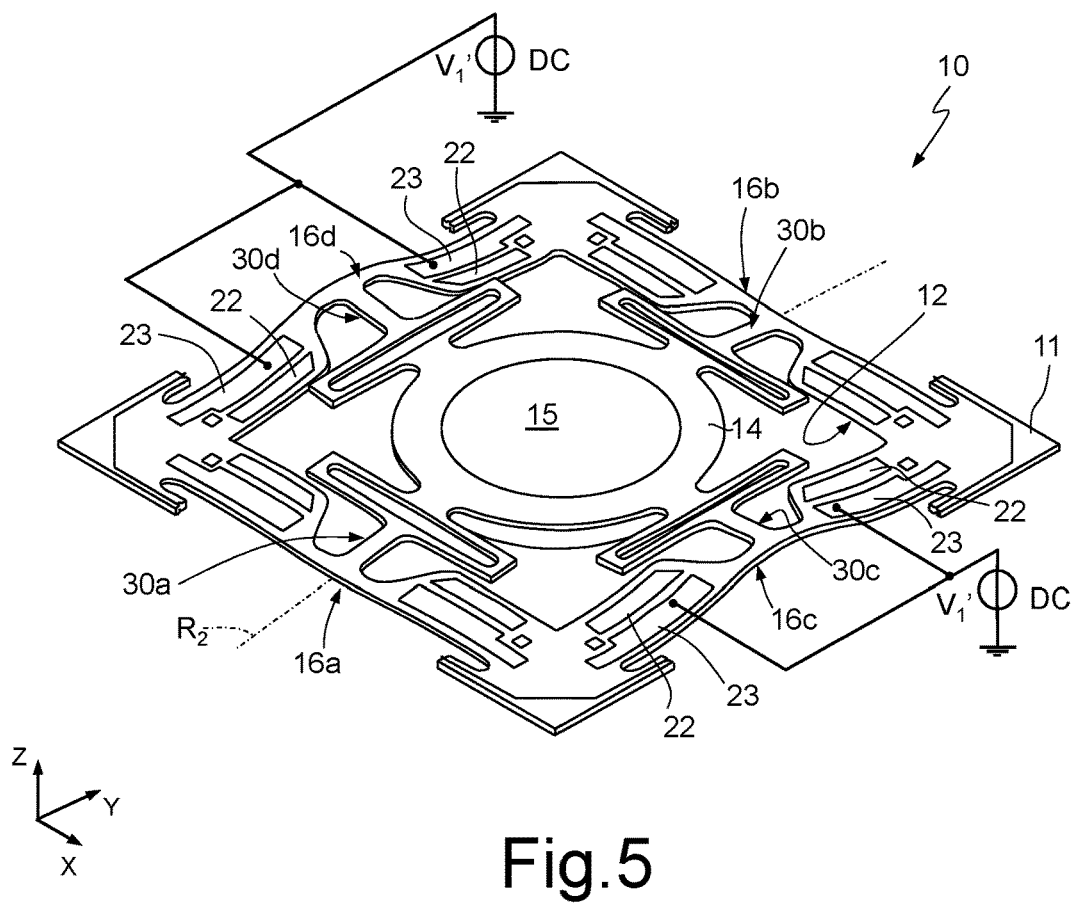
FIG. 5 is a schematic view of the MEMS structure of FIG. 3, subjected to a movement of adjustment of the resonance frequency.

For instance, and with reference to FIG. 5, the variation of the resonance frequency of the second rotational mode about the second rotation axis R2 (parallel to the second horizontal axis Y) is obtained by biasing a first set of the adjustment electrodes 23, associated with the third and the fourth supporting elements 16c, 16d, which are biased together at a same first DC biasing voltage V1', for example, equal to 40 V.

This biasing causes substantially the same deformation outside of the horizontal plane XY of the third and the fourth supporting elements 16c, 16d (in the example, an upwards deformation along the vertical axis Z), and a consequent stiffening of the same third and fourth supporting elements 16c, 16d.

When the biasing voltage is applied to the respective actuation electrodes 22, this stiffening causes, in the example, a variation of the resonance frequency of the aforesaid second rotational mode.

It should be noted that the deformation of the third and fourth supporting elements 16c, 16d, having the same value, does not cause deformation of the associated third and fourth elastic-coupling elements 30c, 30d and, consequently, rotation of the mobile mass 14; moreover, no deformation of the first and the second supporting elements 16a, 16b and of the associated first and second elastic-coupling elements 30a, 30b is generated (the rotational modes are hence decoupled also regarding adjustment of the corresponding resonance frequency).

In a similar manner (here not illustrated), the frequency difference $\Delta f$ can be obtained by varying the resonance frequency of the first rotational mode, which can be obtained by biasing a second set of the adjustment electrodes 23 associated with the first and the second supporting elements 16a, 16b, which can in this case be biased together at a second, DC, biasing voltage VT, which may possibly be equal to the first biasing voltage V1'.

Alternatively, the aforesaid frequency difference $\Delta f$ may be obtained by an appropriate variation of the resonance frequency both of the first and of the second rotational modes, in this case an appropriate biasing of both the first set and the second set of adjustment electrodes 23 being thus envisaged.

The advantages of these embodiments emerge clearly from the foregoing description.

In any case, it is underlined that this substantially enables elimination of cross-axis interference in the MEMS structure 10, entirely decoupling the first and the second rotational modes (about the first and the second rotation axes R1, R2, respectively).

In particular, the aforesaid first and second rotational modes are decoupled both regarding the movement of actuation (obtained by biasing of the actuation electrodes 22) and regarding adjustment of the corresponding resonance frequency (obtained by biasing of the adjustment electrodes 23).

Moreover, as compared to known prior art (see, for example, U.S. Pat. No. 9,843,779 (EP 3,173,843)), in the MEMS structure 10 just one actuation electrode 22 and just one adjustment electrode 23 are present for each of the supporting portions 20', 20" of the supporting elements 16a-16d, thus drastically reducing the number and complexity of the electrical connections.

As discussed previously, the electrical-connection paths 36 between the actuation and the adjustment electrode 22, 23 and the corresponding electrical-contact pads 35 have a reduced length and moreover do not extend over the supporting elements 16a-16d, and hence do not cause appreciable variation of the corresponding elastic characteristics.

Figure 6:
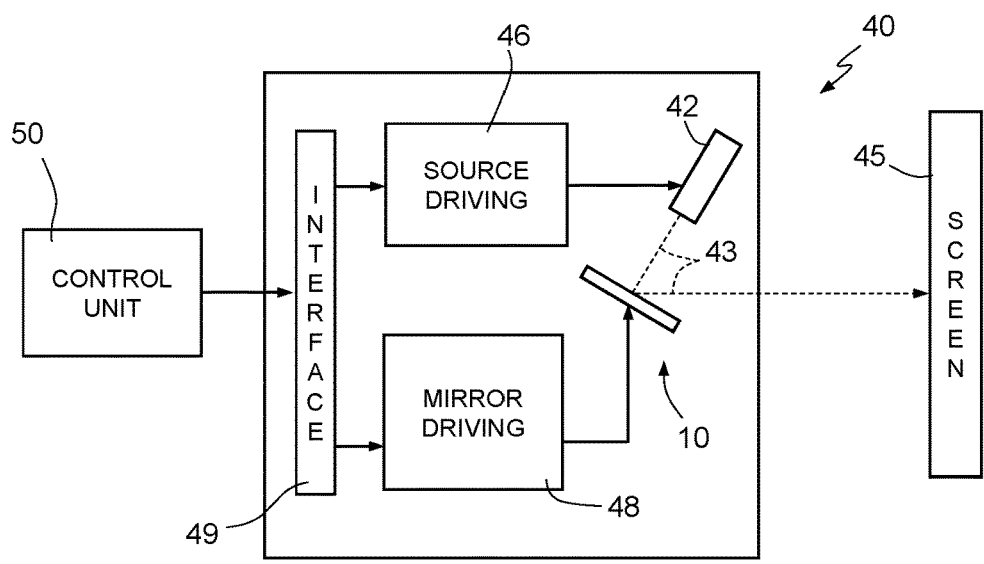
FIG. 6 is a block diagram of a pico-projector device that integrates the MEMS structure of FIG. 3.
Figure 7:
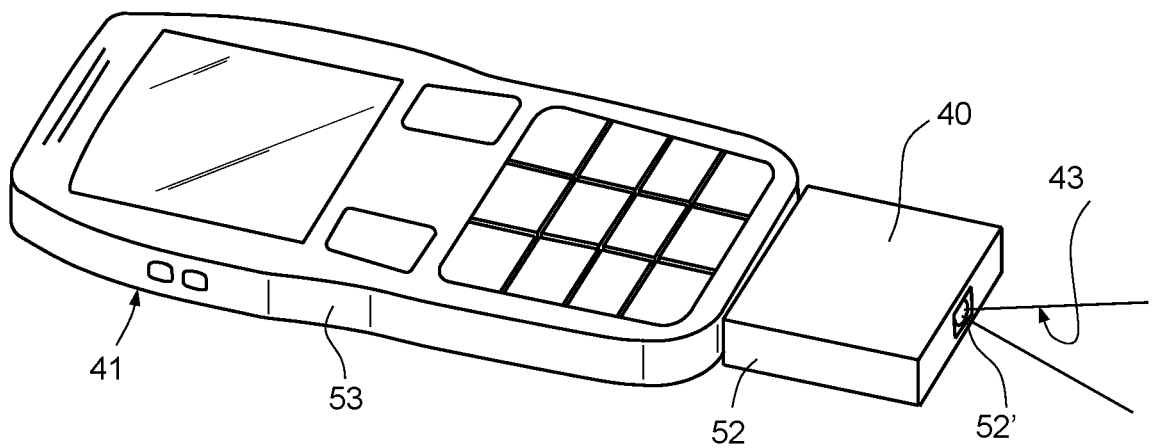
FIGS. 7 and 8 show possible variants of coupling between the pico-projector device of FIG. 6 and a portable electronic apparatus.
Figure 8:
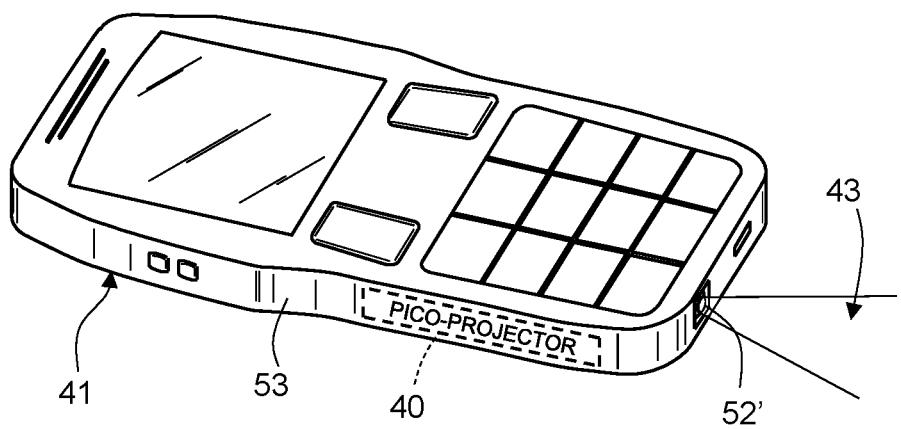

Advantageously, the MEMS structure 10 may, for example, be integrated in a pico-projector device 40 designed to be operatively coupled to a portable electronic apparatus 41, as illustrated schematically with reference to FIGS. 6-8.

In detail, the pico-projector device 40 of FIG. 6 comprises: a light source 42, for example of a laser type, configured to generate a light beam 43; the MEMS structure 10, having the function of reflector (mirror) and configured to receive the light beam 43 and direct it towards a screen or display surface 45 (external to, and set at a distance from, the pico-projector device 40); a first driving circuit 46, configured to supply appropriate control signals to the light source 42 for generation of the light beam 43 as a function of an image to be projected; a second driving circuit 48, configured to supply biasing signals to the MEMS structure 10 (in particular, to the corresponding actuation and adjustment electrodes 22, 23, according to the modalities discussed previously) and to receive appropriate feedback signals from the MEMS structure 10 (in particular, from the corresponding piezoresistive sensors 25'); and a communication interface 49, configured to receive, from an external control unit 50, for example included in the portable electronic apparatus 41, information on the image to be generated, for example in the form of a pixel array. This information is sent at input for driving the light source 42.

The pico-projector device 40 can be obtained as a standalone accessory separate from the associated portable electronic apparatus 41, for example a smartphone, as illustrated in FIG. 7. In this case, the pico-projector device 40 is coupled to the portable electronic apparatus 41 by appropriate electrical and mechanical connection elements (not illustrated in detail). Here, the pico-projector device 40 is provided with a casing 52, which has at least one portion 52' transparent to the light beam 43 directed by the MEMS structure 10; the casing 52 of the pico-projector device 40 is releasably coupled to a respective case 53 of the portable electronic apparatus 41.

Alternatively, as illustrated in FIG. 8, the pico-projector device 40 can be integrated within the portable electronic apparatus 41 and be arranged within the case 53 of the portable electronic apparatus 41. In this case, the portable electronic apparatus 41 has a respective portion 52' transparent to the light beam 43 directed by the MEMS structure 10. The pico-projector device 40 is in this case, for example, coupled to a printed circuit present within the case 53 of the portable electronic apparatus 41.

Finally, it is clear that modifications and variations may be made to what has been described and illustrated herein, without thereby departing from the scope of this disclosure, as defined in the annexed claims.

In particular, variations may in general be envisaged regarding the shape of the elements forming the MEMS structure 10; for example, different shapes of the corresponding mobile mass 14 (and of the corresponding surface of reflecting material 15, i.e., the mirror) may be envisaged.

The invention claimed is:

1. A microelectromechanical (MEMS) structure, comprising:
  a fixed frame internally defining a cavity;
  a mobile mass elastically suspended in the cavity and movable with a first resonant rotational mode about a first rotation axis and with a second resonant rotational mode about a second rotation axis orthogonal to the first rotation axis;
  a pair of supporting elements extending in the cavity and being rigidly coupled to the fixed frame and elastically deformable to cause rotation of the mobile mass about the first rotation axis;
  a pair of elastic-coupling elements elastically coupled between the mobile mass and the pair of supporting elements;
  wherein each of said elastic-coupling elements of said pair of elastic-coupling elements comprises a first elastic portion and a second elastic portion, the first elastic portion being compliant to torsion about said second rotation axis; and
  wherein the second elastic portion of said elastic-coupling elements of the pair of elastic-coupling elements is compliant to bending outside of a horizontal plane of main extension of said MEMS structure.

2. The microelectromechanical structure according to claim 1, wherein the pair of elastic-coupling elements are compliant to rotation about said second rotation axis and rigid with respect to rotation about said first rotation axis.

3. The microelectromechanical structure according to claim 2, further comprising:
  a main extension in a horizontal plane;
  wherein said pair of supporting elements extend along a first horizontal axis of said horizontal plane, on opposite sides of said mobile mass with respect to a second horizontal axis of said horizontal plane, orthogonal to said first horizontal axis;
  wherein said pair of supporting elements comprises first and second supporting portions, which have first ends coupled to the fixed frame and second ends connected by a connection portion, coupled to a respective one of the pair of elastic-coupling elements; and
  wherein the first and second supporting portions of the pair of supporting elements carry, at a top thereof, a respective actuation electrode which is biased to cause deformation by piezoelectric effect.

4. The microelectromechanical structure according to claim 3,
  wherein the actuation electrodes of a first supporting element of said pair of supporting elements are configured to be biased at a first AC biasing voltage and the actuation electrodes of a second supporting element of said pair of supporting elements are configured to be biased at a second AC biasing voltage in phase opposition with respect to the first AC biasing voltage, to cause the rotation of said mobile mass about said first rotation axis at a first resonance frequency.

5. The microelectromechanical structure according to claim 4,
wherein the first and second supporting elements also carry, at a top, a respective adjustment electrode which is biased to cause deformation by piezoelectric effect; and
wherein the adjustment electrodes of said first and second supporting elements are configured to be biased at a first DC biasing voltage to vary said second resonance frequency for rotation of said mobile mass about said second rotation axis.

6. The microelectromechanical structure according to claim 5, wherein the first and second supporting elements each carry, at a top, a region of piezoelectric material arranged on which are their respective actuation electrode and their respective adjustment electrode.

7. The microelectromechanical structure according to claim 6, further comprising:
electrical-contact pads, carried by said fixed frame, electrically connected to said actuation and adjustment electrodes by respective electrical-connection paths; and
wherein said electrical-connection paths extend outside with respect to said first and second supporting elements.

8. The microelectromechanical structure according to claim 1,
wherein each of said elastic-coupling elements of said pair of elastic-coupling elements comprises a first elastic portion and a second elastic portion;
wherein a first elastic portion of the elastic-coupling elements of said pair of elastic-coupling elements is compliant to torsion about said second rotation axis; and
wherein a second elastic portion of said elastic-coupling elements of said pair of elastic-coupling elements is compliant to bending outside of a horizontal plane of main extension of said microelectromechanical structure.

9. The microelectromechanical structure according to claim 1, wherein
said first elastic portions of each of the pair of elastic-coupling elements are of a torsional linear type and have a rectilinear extension with a first end connected to a corresponding supporting element and a second end, opposite to the first end, connected to the corresponding second elastic portions of each of the pair of elastic-coupling elements;
wherein said second elastic portion is of a folded type, with a main extension in a direction transverse to the rectilinear extension of the first elastic portion and a first end connected to said first elastic portion and a second end, opposite to the first end, connected to a facing end portion of the mobile mass.

10. The microelectromechanical structure according to claim 9, wherein the first elastic portion of the elastic-coupling elements of said pair of elastic-coupling elements has a rectilinear extension along the second rotation axis.

11. The microelectromechanical structure according to claim 10, wherein a torsional stiffness of the first elastic portion of said pair of elastic-coupling elements is defined as a function of bending stiffness of the second elastic portion of said pair of elastic-coupling elements and as a function of a stiffness of said pair of supporting elements, so that the first and second rotation axes of the mobile mass are aligned with a direction of extension of the first elastic portion of the elastic-coupling elements of the pair of elastic-coupling elements.

12. A pico-projector device, comprising:
a light source driven for generation of a light beam as a function of an image to be generated;
a microelectromechanical (MEMS) structure comprising:
a fixed frame internally defining a cavity;
a mobile mass elastically suspended in the cavity and movable with a first resonant rotational mode about a first rotation axis and with a second resonant rotational mode about a second rotation axis orthogonal to the first rotation axis;
a mirror surface carried by the mobile mass;
a pair of supporting elements extending in the cavity and being rigidly coupled to the fixed frame and elastically deformable to cause rotation of the mobile mass about the first rotation axis;
a pair of elastic-coupling elements elastically coupled between the mobile mass and the pair of supporting elements;
wherein each of said elastic-coupling elements of said pair of elastic-coupling elements comprises a first elastic portion and a second elastic portion, the first elastic portion being compliant to torsion about said second rotation axis; and
wherein the second elastic portion of said elastic-coupling elements of the pair of elastic-coupling elements are compliant to bending outside of a horizontal plane of main extension of said MEMS structure; and
a driving circuit configured to supply electrical driving signals to cause rotation of said mobile mass.

13. The pico-projector device of claim 12, wherein the pico-projector device is a component of a portable electronic apparatus.

14. The pico-projector device of claim 12, wherein the pair of elastic-coupling elements are compliant to rotation about said second rotation axis and rigid with respect to rotation about said first rotation axis.

15. The pico-projector device of claim 14, further comprising:
a main extension in a horizontal plane;
wherein said pair of supporting elements extend along a first horizontal axis of said horizontal plane, on opposite sides of said mobile mass with respect to a second horizontal axis of said horizontal plane, orthogonal to said first horizontal axis;
wherein said pair of supporting elements comprises first and second supporting portions, which have first ends coupled to the fixed frame and second ends connected by a connection portion, coupled to a respective one of the pair of elastic-coupling elements; and
wherein the first and second supporting portions of the pair of supporting elements carry, at a top thereof, a respective actuation electrode which is biased to cause deformation by piezoelectric effect.

16. The pico-projector device of claim 15, wherein the actuation electrodes of a first supporting element of said pair of supporting elements are configured to be biased at a first AC biasing voltage and the actuation electrodes of a second supporting element of said pair of supporting elements are configured to be biased at a second AC biasing voltage in phase opposition with respect to the first AC biasing voltage, to cause the rotation of said mobile mass about said first rotation axis at a first resonance frequency.

17. The pico-projector device of claim 16,
wherein the first and second supporting elements also carry, at a top, a respective adjustment electrode which is biased to cause deformation by piezoelectric effect;
wherein the adjustment electrodes of said first and second supporting elements are configured to be biased at a first DC biasing voltage to vary said second resonance frequency for rotation of said mobile mass about said second rotation axis.

18. The pico-projector device of claim 17, wherein the first and second supporting elements each carry, at a top, a region of piezoelectric material arranged on which are their respective actuation electrode and their respective adjustment electrode.

19. The pico-projector device of claim 18, further comprising:
electrical-contact pads, carried by said fixed frame, electrically connected to said actuation and adjustment electrodes by respective electrical-connection paths; and
wherein said electrical-connection paths extend outside with respect to said first and second supporting elements.

20. The pico-projector device of claim 12,
wherein each of said elastic-coupling elements of said pair of elastic-coupling elements comprises a first elastic portion and a second elastic portion;
wherein a first elastic portion of the elastic-coupling elements of said pair of elastic-coupling elements is compliant to torsion about said second rotation axis; and
wherein a second elastic portion of said elastic-coupling elements of said first pair of elastic-coupling elements is compliant to bending outside of a horizontal plane of main extension of said microelectromechanical structure.

* * * * *